(12) United States Patent
Haran et al.

(10) Patent No.: US 12,267,776 B2
(45) Date of Patent: Apr. 1, 2025

(54) METHOD FOR LOW-POWER V2X BASED ON EARLY RECEPTION TERMINATION

(71) Applicant: Autotalks Ltd., Kfar Netter (IL)

(72) Inventors: Onn Haran, Kfar Netter (IL); Leonid Menis, Kfar Netter (IL); Ohad Ashery Bonaventura, Kfar Netter (IL); Amos Freund, Kfar Netter (IL)

(73) Assignee: Autotalks Ltd., Kfar Netter (IL)

( * ) Notice: Subject to any disclaimer, the term of this patent is extended or adjusted under 35 U.S.C. 154(b) by 429 days.

(21) Appl. No.: 17/889,411

(22) Filed: Aug. 17, 2022

(65) Prior Publication Data

US 2023/0164694 A1    May 25, 2023

Related U.S. Application Data

(60) Provisional application No. 63/281,699, filed on Nov. 21, 2021.

(51) Int. Cl.
| | |
|---|---|
| *H04W 40/12* | (2009.01) |
| *H04W 4/40* | (2018.01) |
| *H04W 24/08* | (2009.01) |
| *H04W 52/02* | (2009.01) |
| *H04W 52/52* | (2009.01) |
| *H04L 1/00* | (2006.01) |

(52) U.S. Cl.
CPC ......... *H04W 52/0225* (2013.01); *H04W 4/40* (2018.02); *H04W 24/08* (2013.01); *H04W 52/52* (2013.01); *H04L 1/0053* (2013.01)

(58) Field of Classification Search
CPC ............. H04W 52/02; H04W 52/0209; H04W 52/0225; H04W 52/0229; H04W 52/0238; H04W 4/30; H04W 4/40; H04W 4/42–46; H04W 52/04; H04W 52/52; H04W 52/00; H04W 52/38; H04L 1/0053; H04L 43/00; H04L 63/0227; H04L 63/0236
See application file for complete search history.

(56) References Cited

U.S. PATENT DOCUMENTS

| | | | |
|---|---|---|---|
| 2012/0195211 A1* | 8/2012 | Jonsson | H04B 1/7097 370/252 |
| 2013/0279491 A1* | 10/2013 | Rubin | G08G 1/162 370/347 |
| 2019/0116462 A1* | 4/2019 | Sagesaka | H04W 4/44 |
| 2021/0112396 A1* | 4/2021 | Cheng | H04W 8/24 |
| 2021/0321364 A1 | 10/2021 | Ben-Ari et al. | |
| 2022/0015099 A1* | 1/2022 | Fouad | H04W 72/542 |

(Continued)

FOREIGN PATENT DOCUMENTS

| | | | | |
|---|---|---|---|---|
| CN | 111354206 | * | 6/2020 | ........... G08G 1/0967 |
| CN | 114557087 | * | 6/2022 | ............ H04W 72/04 |
| CN | 114600512 A | | 6/2022 | |

*Primary Examiner* — Warner Wong
(74) *Attorney, Agent, or Firm* — Nathan & Associates; Menachem Nathan

(57) ABSTRACT

Device comprising a vehicle-to-everything (V2X) communications receiver configured to determine, using V2X communications, that a vehicle is a safety-relevant vehicle posing a potential danger to a vulnerable road user (VRU), and to receive only transmissions of the safety-relevant vehicle and skip reception of transmissions of non-safety-relevant vehicles, thereby lowering V2X reception power consumption of a device carried by the VRU, and methods for used thereof.

10 Claims, 7 Drawing Sheets

(56) References Cited

U.S. PATENT DOCUMENTS

| | | | | |
|---|---|---|---|---|
| 2022/0068120 A1* | 3/2022 | Alfano | ............... | G08G 1/093 |
| 2022/0174682 A1* | 6/2022 | Li | ............... | H04W 72/1263 |
| 2022/0244745 A1* | 8/2022 | Bisht | ............... | G08G 5/34 |
| 2022/0278933 A1* | 9/2022 | Wu | ............... | H04W 4/021 |
| 2022/0386092 A1* | 12/2022 | Hwang | ............... | H04W 4/02 |
| 2023/0164694 A1* | 5/2023 | Haran | ............... | H04W 4/12 |
| | | | | 370/318 |
| 2023/0247554 A1* | 8/2023 | Yoshioka | ............... | H04W 92/18 |
| | | | | 370/318 |
| 2023/0298396 A1* | 9/2023 | Hehn | ............... | H04W 4/46 |
| | | | | 701/31.4 |
| 2024/0089713 A1* | 3/2024 | Hwang | ............... | G01H 17/00 |
| 2024/0121572 A1* | 4/2024 | Ramachandran | ..... | H04W 4/021 |
| 2024/0179680 A1* | 5/2024 | Li | ............... | H04W 72/02 |
| 2024/0314692 A1* | 9/2024 | Kang | ............... | H04W 52/0235 |
| 2024/0349182 A1* | 10/2024 | Haran | ............... | H04W 52/0209 |

* cited by examiner

METHOD FOR LOW-POWER V2X BASED ON EARLY RECEPTION TERMINATION

CROSS REFERENCE TO RELATED APPLICATIONS

This application claims priority from U.S. Provisional Patent Application No. 63/281,699 filed on Nov. 21, 2021, which is expressly incorporated herein by reference in its entirety.

FIELD

The disclosure relates generally to a low-power vehicle-to-everything (V2X) communications (or simply "V2X") operation scheme for a battery-operated device, and in particular to a scheme minimizing a V2X reception operation for Vulnerable Road User (VRU) protection to reception of messages from safety-relevant vehicles. As used herein, the term "safety-relevant" as applied to a vehicle refers to a vehicle that can potentially endanger the VRU within a few seconds.

BACKGROUND

V2X can protect all road users through direct communication. Vehicles are the first to deploy V2X. Vulnerable road users should be part of the V2X network, since the number of road fatalities of vehicle occupants is lower than that of non-occupants in many places including Europe. Motorcyclists, cyclists, eScooter riders, and pedestrians are all VRUs.

One of the major challenges of a VRU safety device is power consumption. VRUs typically carry battery-operated handheld devices, like smartphones, smartwatches, fitness trackers, and other wearables. In all such devices, battery life, as measured by days between charges, is a key selling point. V2X can be added to a battery-operated device only if it does not shorten battery life noticeably.

Some wireless standards, like Bluetooth, are designed to operate with a battery. Common properties of a low-power wireless standard are low bandwidth, simple modulation, and operational cycles allowing shut-down of the device. V2X wireless standards, either 802.11p, 3GPP C-V2X Rel. 14/15 (LTE-V2X) or Rel. 16/17 (NR-V2X), were designed for other purposes, in particular, long communication range, short latency, and high channel capacity even in presence of congestion. A V2X solution without low-power modifications cannot be used in battery-operated handheld devices due to the high power consumption.

Power consumption can be reduced by configuring V2X to transmit-only operation without any reception capability. However, this will reduce the safety benefit because the VRU will not be alerted of endangering vehicles.

It is desired to receive all messages from safety-relevant vehicles while limiting the duration of V2X reception operation (i.e. minimizing the reception of non safety-relevant vehicles) to lower power consumption. This can be referred to as "limited reception V2X".

SUMMARY

In various example embodiments, there is provided a method, comprising determining, using V2X communications, that a vehicle is a safety-relevant vehicle posing a potential danger to a VRU, and receiving only transmissions of the safety-relevant vehicle and skipping reception of transmissions of non-safety-relevant vehicles, thereby lowering V2X reception power consumption of a device carried by the VRU.

In some examples, the determining that a vehicle is a safety-relevant vehicle includes receiving V2X messages from a plurality of vehicles during a predetermined period and grading the safety-relevance of each vehicle using a respective respective location, speed, and heading of each vehicle.

In some examples, the receiving of only transmissions of the safety-relevant vehicle while skipping the reception of transmissions of non-safety-relevant vehicles includes: identifying periodically a slot and a respective subchannel for V2X transmission of the safety-relevant vehicle and receiving the current slot and respective subchannel if the current slot and respective subchannel are identified as allocated to the safety-relevant vehicle, or skipping the reception of the current slot and respective subchannel if the current slot and respective subchannel are not identified as allocated to the safety-relevant vehicle, terminating the reception of the current slot and respective subchannel if the current slot and respective subchannel are identified as allocated to the safety-relevant vehicle but do not include transmissions of the safety-relevant vehicle, and if the current slot and respective subchannel do not include transmissions of the safety-relevant vehicle, scanning for transmissions of the safety-relevant vehicle in slots and respective subchannels proximal to the current slot and subchannel and, upon finding such proximal slots and respective subchannels, updating a database with the found slots and respective subchannels.

In some examples, the terminating of the reception current slot and respective subchannel includes activating a V2X receiver, measuring subchannel energy received during an AGC symbol, comparing the measured energy of each subchannel with a threshold, and if, the measured energy is lower than the threshold, terminating the reception.

In various example embodiments, there is provided a device, comprising a V2X receiver configured to determine, using V2X communications, that a vehicle is a safety-relevant vehicle posing a potential danger to a VRU, and to receive only transmissions of the safety-relevant vehicle and skip reception of transmissions of non-safety-relevant vehicles, thereby lowering V2X reception power consumption of a device carried by the VRU.

In some examples, the V2X receiver includes an AGC unit configured to measure subchannel energy and the device further comprises a slot filter that provides an input used by the AGC unit to decide whether to receive or stop reception of the packet.

In some examples, the V2X receiver includes a data channel receiver and a control channel receiver, and the device further comprises a L1 ID filter configured to hold an expected L1 ID value and to match the expected L1 ID value with a L1 ID value received in a physical sidelink control channel (PSCCH) by the control data receiver.

In some examples, if the AGC unit did not stop reception and if the expected L1 ID value matched the received L1 ID value, the L1 ID filter is further configured to store a physical sidelink data channel (PSSCH) only for the given subchannel.

In some examples, the device further comprises a safety-relevant vehicles controller configured to determine that a vehicle is to be monitored with a given periodicity and to provide to the V2X receiver an input to determine that the vehicle is a safety-relevant vehicle.

BRIEF DESCRIPTION OF THE DRAWINGS

Non-limiting examples of embodiments disclosed herein are described below with reference to s attached hereto that are listed following this paragraph. Identical structures, elements or parts that appear in more than one figure are generally labeled with a same numeral in all the figures in which they appear. If identical elements are shown but numbered in only one figure, it is assumed that they have the same number in all figures in which they appear. The drawings and descriptions are meant to illuminate and clarify embodiments disclosed herein and should not be considered limiting in any way. In the drawings.

DETAILED DESCRIPTION

Figure 1:
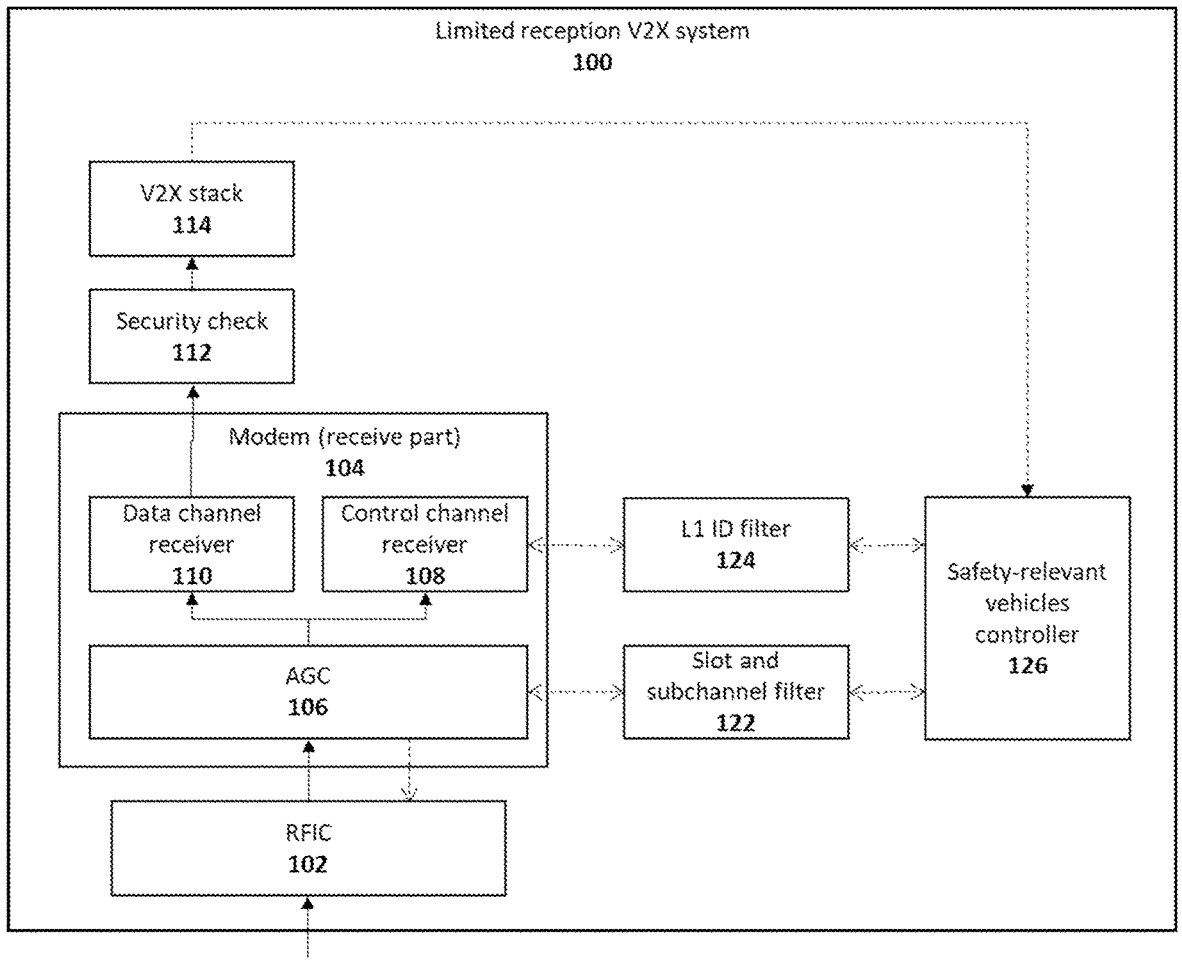
FIG. 1 illustrates a block diagram of a device for low-power V2X based on early reception termination disclosed herein.

FIG. 1 illustrates a block diagram of a device (or "system") for low-power V2X based on early reception termination disclosed herein and numbered 100. Device 100 may be used for NR-V2X (defined by 3GPP C-V2X standard Rel. 16/17) operation. The transmit functionality is omitted from the diagram because transmit is unmodified from any other V2X device. Device 100 comprises a radio-frequency integrated circuit (RFIC) 102 and a receive part of a modem (also referred to as "V2X receiver") 104 which includes an adaptive gain control (AGC) unit 106, a control channel receiver 108 and a data channel receiver 110. Device 100 further comprises a security check layer 112 and a V2X stack 114 as defined by the respective ETSI or IEEE protocols. Device 100 further comprises a slot filter 122, a L1 ID filter 124, and a safety-relevant vehicles controller 126 The functionality/operation of each components is described below. Exemplarily, device components 102, 104, 112, 122 and 124 are implemented in hardware.

Modem, 104 embeds 3 major subblocks—106, 108 and 110. AGC 106 sets the gain of the RF front end. In known art, AGC measures the energy of the entire first symbol of the packet to obtain the most accurate measurement.

During operation, a packet is first received by RFIC 102. The RFIC is optimized for low-power consumption even at the expense of higher noise. The RFIC demodulates signals of the received packet and forwards quadrature signal (IQ) samples to the receiving part of the modem 104. The modem reception processing capacity is lowered for power consumption reduction. In a regular V2X device, the modem is capable of continuously receiving all messages, which could sum to 10 messages per 0.5 msec slot, reaching thousands of messages per second. For pedestrian safety, assume that only 3 vehicles are posing a maximal risk. Therefore, only ~30 "safety-critical" messages per second need typically be received. A bicycle is moving faster than a pedestrian, therefore one can assume that the number of vehicles putting it at risk is doubled to six. For a motorcycle which moves even faster, the number of vehicles putting it at risk may be tripled to 9. All of this is far lower than the theoretical channel capacity of 200 vehicles reception.

In addition to receiving the safety-critical messages, device 100 needs to scan the V2X channel to identify vehicles that become safety-relevant and scan slots of their transmissions. Overall, the modem (V2X receiver) 104 implementation disclosed herein can be scaled down to receiving only one or two messages per slot. The reduction of requirements enables shrinking the modem memory and using weaker hardware, with only 5-10% of the capacity of a regular V2X device. That translates linearly to lower power consumption and a smaller silicon area.

The limited-reception V2X disclosed presents a first modification vs known reception by obtaining an early indication of specific slot and subchannels reception, by associating the specific slot and subchannels with a safety-relevant vehicle, and by determining early if the slot should be terminated for power reduction. The association between a specific subchannel and vehicle identity is performed during the scan. A second modification enables quickly obtaining energy indication for terminating the remainder of AGC operation if the energy is far below a threshold. With these two modifications, the AGC is the prime gate for packet reception and the most important contributor to power reduction by activity reduction. The AGC is configured by slot filter 122, which determines an action taken per each subchannel: process, ignore, or scan.

Process: energy is measured only for the subchannels of the safety-relevant vehicle. If the energy level in those subchannels is too low, the reception is terminated.

Ignore: the slot is not received at all. The AGC is inactivated.

Scan: energy is measured for all subchannels.

If the AGC had not stopped packet reception, next, a PSCCH is received by control channel receiver 108. During a periodic scan, PSCCH operates on the strongest subchannels and L1 ID filter 124 is inactivated. After PSCCH content is processed and parsed, the received L1 ID is used to determine if reception should be aborted as configured by L1 ID filter 124. The L1 ID filter holds the expected value of L1 ID, as recorded during the scan. If the received L1 ID value does not match the expected L1 ID value, this means the transmitter changed the slot to another slot in proximity. The L1 ID is searched in potential new slots in proximity. Alternatively, if the L1 ID filter matched the expected L1 ID value, the remainder of the slot (the PSSCH) is received by data channel receiver 110 and stored in an embedded memory (not shown) in the device. Known art implementations first store all received data. Only afterwards does a digital signal processor (DSP) start processing. Here, only the PSSCH of the relevant subchannels is stored, for reducing the required memory size, cost, and power.

After completion of PSSCH processing, the resulted data is forwarded to security layer 112 which checks (verifies) the authenticity of the data The processing capability of the security layer is scaled down from full line rate capacity (which is typically over 2,000 per second), to the amount of safety of relevant messages for power and area reduction. Scanned packet verification can be skipped, since even a false decision to monitor a vehicle would not prevent the monitoring of safety-relevant vehicles and alerting of the VRU when needed. After the received packet was verified, it is forwarded to V2X stack 114. The V2X stack is adapted for low-power operation by adding the capability to partially parse a packet, extracting only location fields during the scan, and skipping irrelevant fields during application parsing.

The parsed location, speed, and heading fields are forwarded to safety-relevant vehicles controller 126, which determines which vehicles should be monitored and at what periodicity, based on their potential safety risk, by applying a safety relevancy check. Entries of each slot are stored in a database in controller 126 (not shown). The database contains an entry per 0.5 msec slot in the 100 msec cycle, totaling 200 entries. Each slot entry contains the following fields:

Vehicle #1: Information on the first vehicle monitored in slot
Subchannel [4-bits]: index of subchannel carrying vehicle #1
Periodicity [2/3-bits]: Representation of vehicle #1 monitoring periodicity: 1, 2, 4, or 8 cycles
L1 ID [24-bits]: ID of vehicle #1
Vehicle #2: Information on the second vehicle monitored in slot
Subchannel [4-bits]: index of subchannel carrying vehicle #2
Periodicity [2/3-bits]: vehicle #2 monitoring periodicity
L1 ID [24-bits]: ID of vehicle #2
HARQ subchannels [10-bits]: bitmap of subchannel indices to ignore during a scan since those contain the second copy of a message that was already supposed to be received from the first copy The database entry suits hardware capable of receiving 2 subchannels in a slot. The number of monitored vehicles should be adjusted according to actual hardware capacity. Slot filter 122 and L1 ID filter 124 receive the respective entry from the database before the beginning of the slot. The slot filter indicates to the AGC unit which subchannel to process. The L1 ID filter provides the L1 ID value to match with the value received in the PSCCH.

Figure 2A:
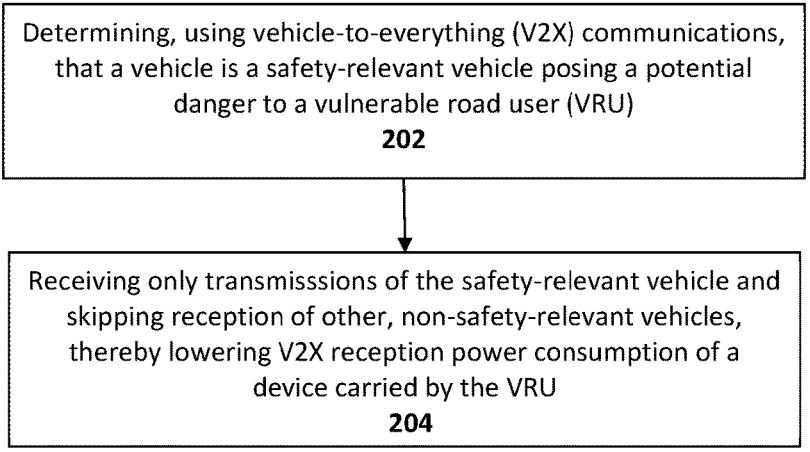
FIG. 2A of a method for low-power V2X based on early reception termination disclosed herein.

FIG. 2A illustrates general steps of a method for low-power V2X based on early reception termination disclosed herein. In step 202, a device like device 100 determines, using V2X communications, that a vehicle is a safety-relevant vehicle posing a potential danger to a VRU. In step 204, the device receives only transmissions of the safety-relevant vehicle and skips reception of other, non-safety-relevant vehicles, thereby lowering V2X reception power consumption.

Figure 2B:
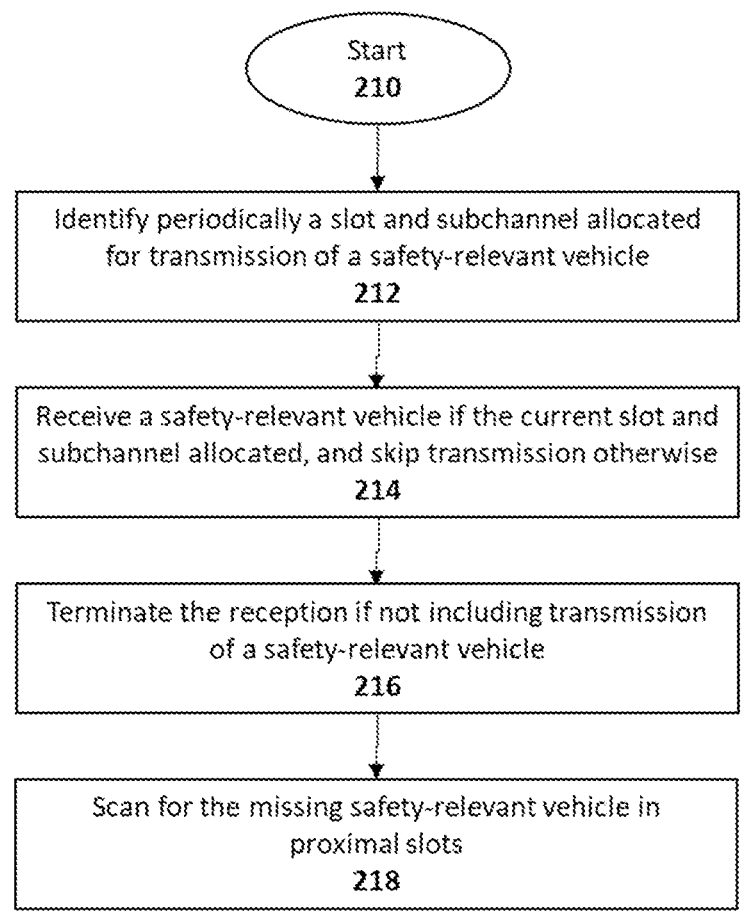
FIG. 2B illustrates more details of the method of FIG. 2A.

FIG. 2B illustrates a flow chart with more details of the method in FIG. 2A. The method basically restricts reception to only messages of safety-relevant vehicles, and terminates reception in other slots (with messages from vehicles that are not safety-relevant) as soon as possible (for example, immediately after the AGC or immediately after control channel PSCCH reception). The operation begins in step 210 every 0.5 mSec slot. Next, in step 212, slots and respective subchannels allocated for transmissions of safety-relevant vehicles are identified periodically (e.g. every few seconds) by scanning all slots, grading the safety relevance of the vehicle, and selecting the most safety-relevant vehicles for reception. Next, in step 214, a current slot and respective subchannel identified as allocated to a safety-relevant vehicle and received, or, if a current slot and respective subchannel are not identified as allocated to a safety-relevant vehicle, the reception is skipped. In case a safety-relevant vehicle expected to be found in the received current slot and respective subchannel is not found, in step 216, the reception is terminated if the subchannel energy received during the AGC is low (for a "low" criterion, see step 506 below), or after reception of the control channel PSCCH if the received L1 ID does not match the expected value. Next, in step 218, continuing to search for the missing safety-relevant vehicle, a scan of transmissions of the safety-relevant vehicle is performed in proximal slots (i.e. the ID of the safety-relevant vehicle is searched in nearby slots). If the ID of the safety-relevant vehicle is found in a proximal slot, then the database (not shown) in safety-relevant vehicles controller 126 is updated for the next cycle (100 mSec) in which the same slot will be received, i.e. where the safety-relevant vehicle is supposed to transmit again.

Figure 3:
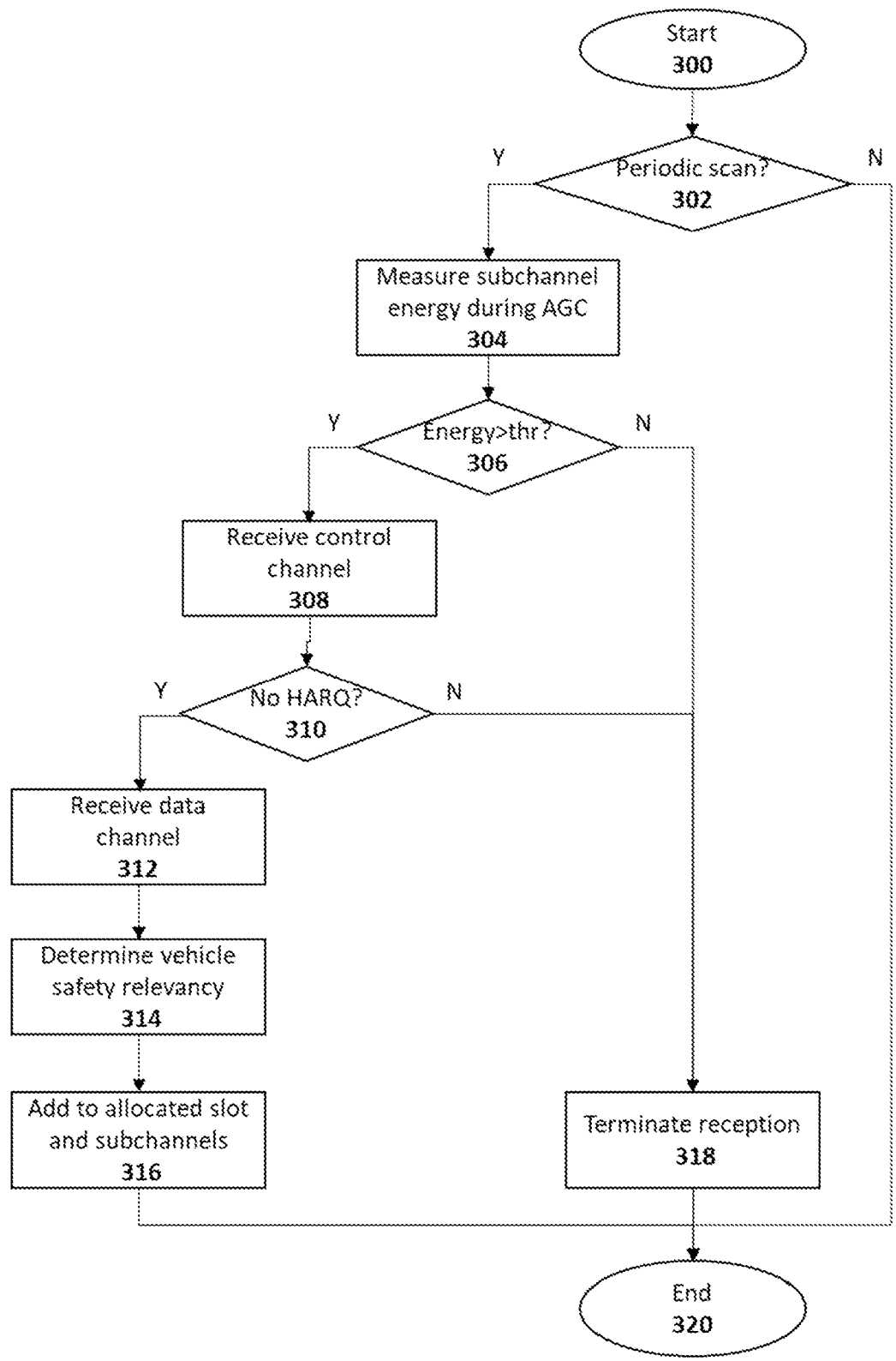
FIG. 3 illustrates a flow chart for identifying slots and subchannels allocated for transmission of safety-relevant vehicles.

FIG. 3 illustrates a flow chart for identifying slots and subchannels allocated for transmission of safety-relevant vehicles, i.e. provides details on the operation in step 212. The operation begins periodically in step 300 in each slot. In step 302, a check if a periodic scan is due is made by controller 126. Each subchannel of the slot is scanned periodically. The periodic scan spans all 0.5 msec slots in the 100 msec cycle. The period is set statically, typically between 1 second and 3 seconds. A longer period lowers the power consumption but increases the latency of detecting a danger from an unmonitored vehicle. If a scan is not due, the operation ends in step 320. Otherwise, if a scan is due, the operation continues to step 304, where modem 104 is activated and subchannel energy is measured during reception of the AGC symbol (see 801 in FIG. 8). Next, in step 306, the energy of each subchannel is compared with a threshold by slot filter 122. The threshold is set as the typical energy received from vehicles 100 m away, for example around −80 dBm. If the energy is lower than the threshold, then the reception is terminated in step 318 and operation ends in step 320. If the measured energy is higher than the threshold, the operation continues to step 308, where the control channel PSCCH is received by control channel receiver 108. Next, step 310 checks if a second copy of the packet (HARQ) is not contained in another slot. If HARQ is contained in the current reception of the control channel, then the reception is terminated in step 318. If not contained, the operation continues to step 312 where the data channel PSSCH is received by data channel receiver 110. The location, speed, and direction fields are parsed, while security validation can be skipped, as explained above. Those location, speed, and direction fields are used in step 314 to determine the safety relevancy of the received vehicle, quantifying the potential risk the received vehicle imposes on the VRU. The safety risk for self-VRU is based on two factors, as explained in FIG. 7:

Time-To-Collision (TTC): The time it would take the received vehicle to reach the VRU. The relevancy increases when TTC is shorter.

Perpendicular distance from received vehicle (i.e. the distance of the vertical axis of the road between the VRU and vehicle): when walking as a pedestrian or riding in parallel to vehicle, the shorter the perpendicular distance between the VRU's future path to the vehicle's future path, the higher the risk. The calculated risk determines if the received vehicle should be monitored and how often.

After the relevancy was calculated in step 314 (see also FIG. 7), and if the vehicle is determined to be indeed a safety-relevant vehicle, then controller 126 adds in step 316 the slot and respective subchannel to the database (not shown) in safety-relevant vehicles controller 126 to process. The operation then ends at step 320.

Figure 4:
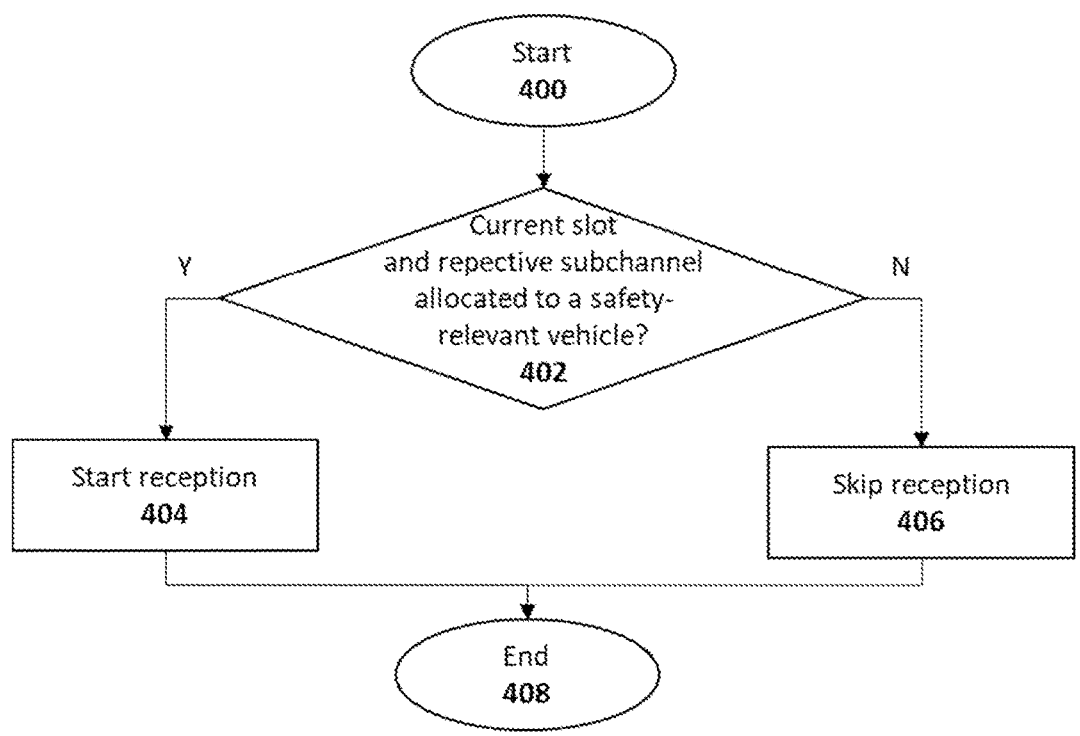
FIG. 4 illustrates a flow chart for receiving a safety-relevant vehicle.

FIG. 4 illustrates a flow chart for receiving a safety-relevant vehicle, i.e. details of step 214. The operation begins in step 400. Next, step 402 checks if the current slot and respective subchannel are allocated to a safety-relevant vehicle. If yes, reception begins in step 404. If no, reception is skipped in step 406. Operation ends in step 408.

Figure 5:
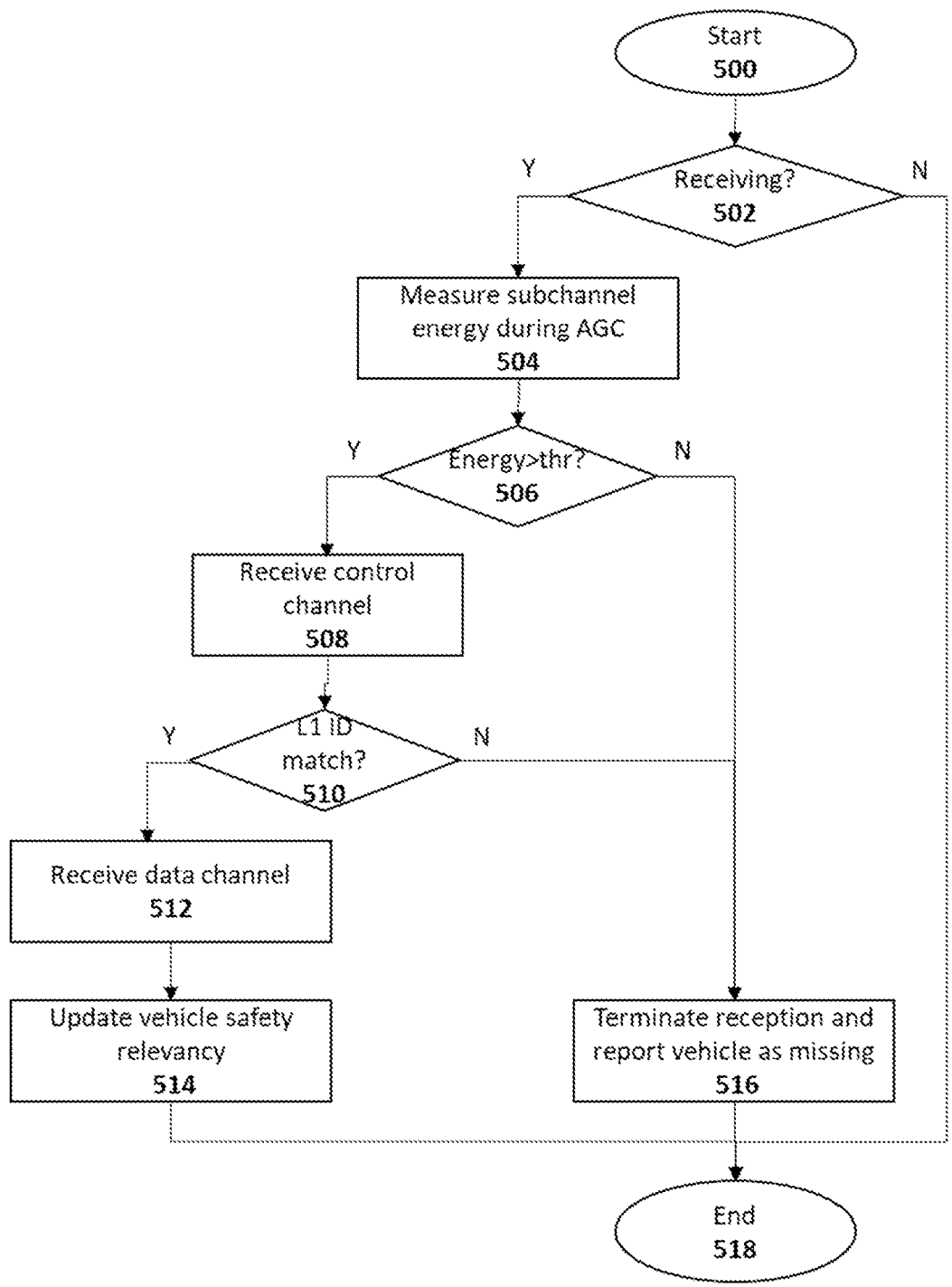
FIG. 5 illustrates a flow chart for terminating the reception if not including the transmission of a safety-relevant vehicle.

FIG. 5 illustrates a flow chart for terminating the reception if the received message does not include a transmission of the expected safety-relevant vehicle, i.e. details of step 216. The operation begins in step 500. Next, step 502 checks if reception is ongoing. If not, the operation ends in step 518. If reception is ongoing, the operation continues to step 504, where the subchannel energy is measured during the AGC symbol. Next, in step 506, the energy is compared with a threshold, as explained re. step 306. If the measured energy is lower than the threshold, then the reception is terminated in step 516 and the safety-relevant vehicle is reported as missing. That is, the safety-relevant vehicle that was supposed to transmit in the slot and respective subchannel has selected a new slot for transmission. Next, the operation ends in step 518. If the measured energy is higher than the threshold, the operation continues to 508, where the control channel PSCCH is received by control channel receiver 108. Next, step 510 checks if the received L1 ID is matching the expected value. If not matched, while CRC is good, then the reception is terminated in step 516. If L1 ID matched, the operation continues to step 512 where the data channel PSSCH is received by data channel receiver 110. Next, the vehicle safety relevance is updated in step 514, as was explained in 314. The operation ends in step 518.

Figure 6:
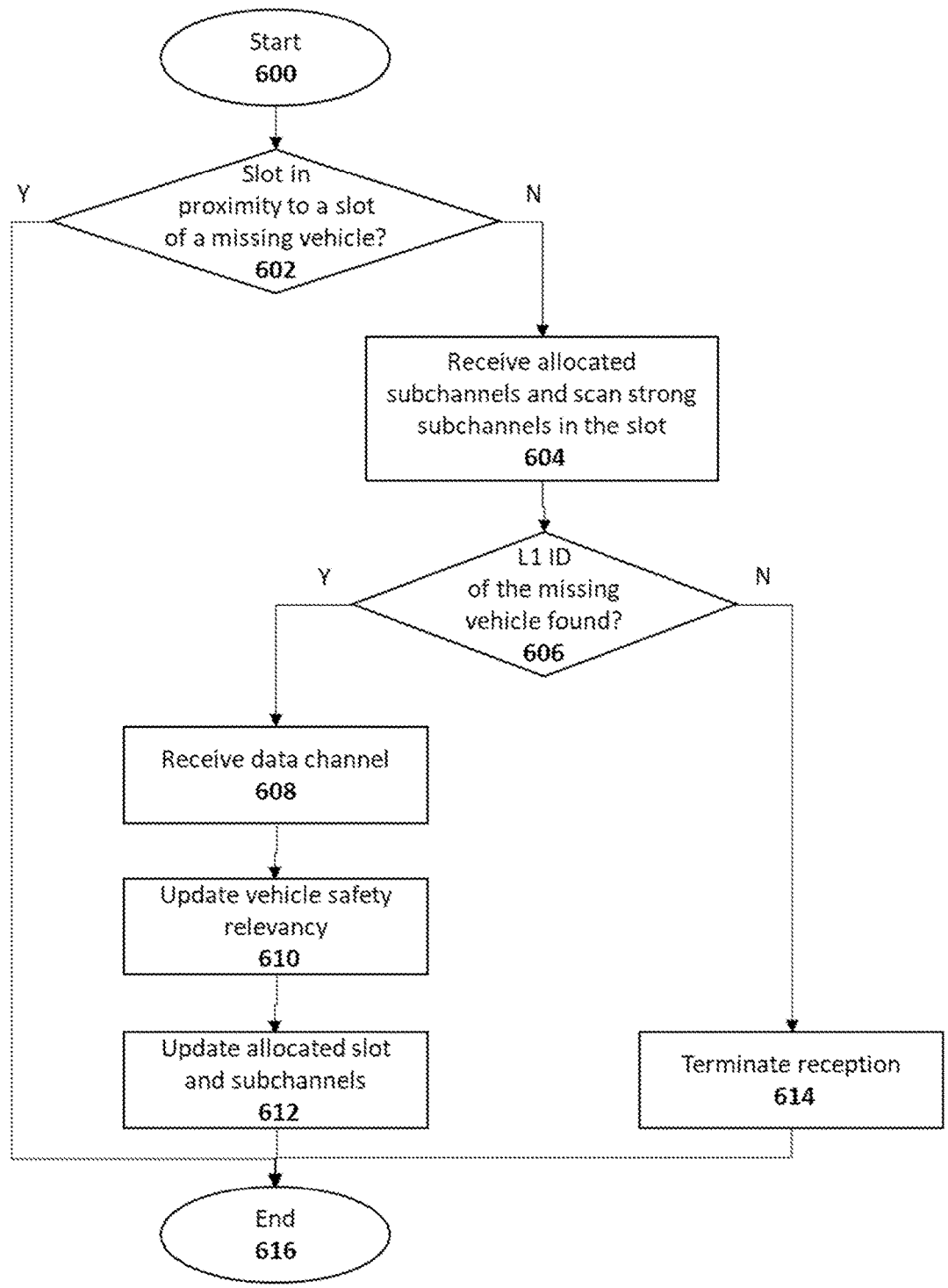
FIG. 6 illustrates a flow chart for scanning for the missing safety-relevant vehicle in proximal slots.

FIG. 6 illustrates a flow chart for scanning for the missing safety-relevant vehicle in proximal slots. The operation begins in step 600. Next, step 602 checks if the current slot is in proximity to a slot of a missing vehicle. C-V2X specification defines the possible span of slots to select, from −5 mSec (10 slots before) to 15 mSec ahead (30 slots after). If the current slot is not within that range, the operation ends in step 616. Otherwise, the operation continues to step 604. The allocated subchannels in the slot are received. In addition, the scan is applied on the strong subchannels in the slot. Next, step 606 checks if the scan identified the L1 ID of the missing vehicle. If no, reception is terminated in step 614, followed by ending in step 616. If yes, step 608 receives the data channel PSSCH, step 610 updates vehicle safety relevancy, and step 612 updates the allocated slot and subchannels based on the location in which the L1 ID was found. The operation ends in step 616.

Figure 7:
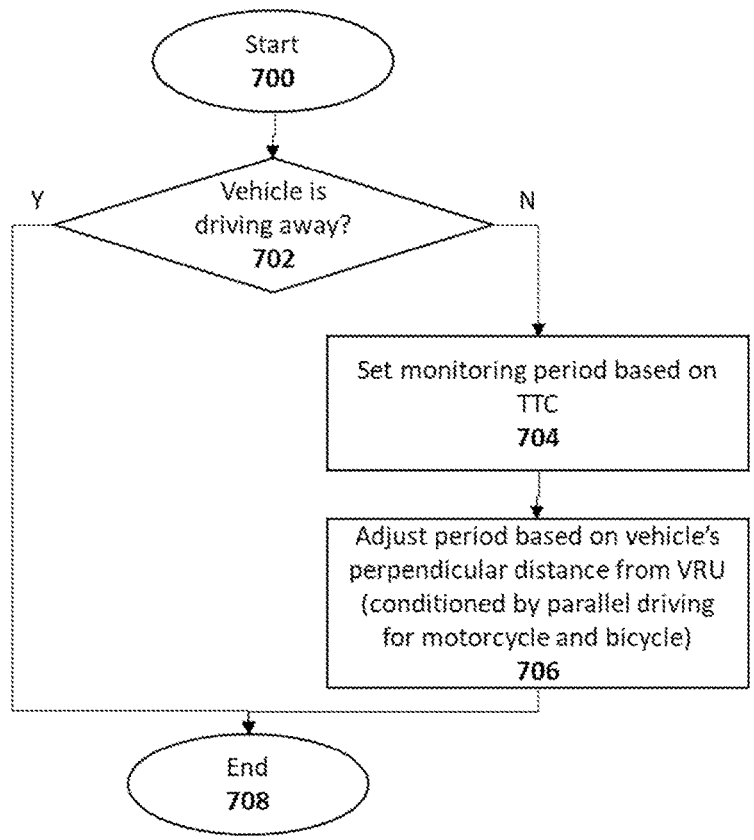
FIG. 7 illustrates a flow chart of vehicle safety relevance calculation.

FIG. 7 illustrates a flow chart of vehicle safety relevance calculation, i.e. identification if a vehicle is safety-relevant or not, implemented by safety-relevant vehicles controller 126. This expands on steps 314 and 514. The flow chart represents processing a single packet from a single vehicle. The operation begins at step 700 after parsing only certain fields such as location, speed, and heading of a vehicle as relayed in a message. The operation continues from step 702, which checks if the vehicle is driving away from the VRU. The test can be performed using two different methods. The more reliable method is to compare the current distance between the vehicle and VRU with a previous distance. The second method is to compare the headings of the VRU and of the vehicle.

If the vehicle is driving away from the VRU, it has no safety relevance, and the operation ends at step 708. Otherwise, the operation continues from step 704. The period for monitoring the vehicle is adjusted based on TTC to lower power consumption. The period is a criterion for safety relevance. If the vehicle is safety-relevant, then the period is short, and the vehicle is received often to track its progress. If the vehicle is not safety-relevant, then period is high, and the vehicle is received rarely (similar to a scan) to track its progress. For example, under 4 seconds the period is adjusted to just 100 msec, under 5 seconds the period is adjusted to 200 msec, under 7 seconds the period is adjusted to 800 msec, and above 7 seconds the subchannel is not monitored. TTC requires prediction of the VRU movement. This can be performed for a motorcycle or a bicycle, but not for pedestrian, for which the current location is used in all predictions. Next, the operation continues from step 706 in which the perpendicular distance is calculated and the period calculated in step 704 is adjusted. If the VRU is pedestrian and, for example, if the distance is greater than 3 meters, the periodicity is doubled, and if the distance is greater than 9 meters the periodicity is quadrupled. For motorcycles and bicycles, the step is performed only if the angle between the heading of the vehicle and the heading of a motorcycle or bicycle is smaller than 10°, meaning riding in parallel. Next, the operation ends at step 708.

Figure 8:
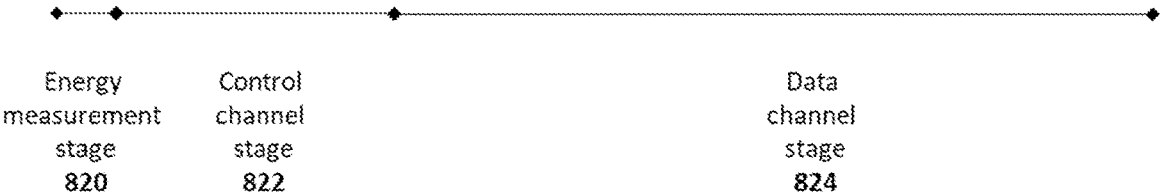
FIG. 8 illustrates low-power reception stages.

FIG. 8 illustrates the low-power reception stages in a limited-reception V2X device like device 100. As specified, a slot is composed of 13 C-V2X symbols, 801 to 813. NR-V2X defines multiple slot structure options. For simplicity, the relevant slot structure option shows the processing stages. As explained above, a regular C-V2X receiver stores the data of all symbols in a memory and then processes stored symbols 801-813. In the low-power receiver of a limited-reception V2X device, there are 3 possible reception stages. Each stage operates on specific symbols, as shown by the line boundaries. The first, energy measurement stage 820, operates on AGC symbol 801 and is performed in real-time without waiting for the subsequent symbols. The reception ends if the measured subchannel energy is too low or if there is a subchannel process. If continuing to the second, control channel stage 822, this stage receives and processes the PSCCH symbols 802 and 803 also in real-time, to terminate reception as early as possible if the packet needs to be ignored, for example, when the vehicle is not safety-relevant or when a HARQ packet copy is received. The third and last stage, data channel stage 824, completes the reception of the entire packet using symbols 804-813.

It is appreciated that certain features of the presently disclosed subject matter, which are, for clarity, described in the context of separate examples, may also be provided in combination in a single example. Conversely, various features of the presently disclosed subject matter, which are, for brevity, described in the context of a single example, may also be provided separately or in any suitable sub-combination.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

Some stages of the aforementioned methods may also be implemented in a computer program for running on a computer system, at least including code portions for performing steps of a relevant method when run on a programmable apparatus, such as a computer system or enabling a programmable apparatus to perform functions of a device or system according to the disclosure. Such methods may also be implemented in a computer program for running on a computer system, at least including code portions that make a computer execute the steps of a method according to the disclosure.

While this disclosure has been described in terms of certain examples and generally associated methods, alterations and permutations of the examples and methods will be apparent to those skilled in the art. The disclosure is to be understood as not limited by the specific examples described herein, but only by the scope of the appended claims.

What is claimed is:

1. A method, comprising:
   determining, using vehicle-to-everything (V2X) communications, that a vehicle is a safety-relevant vehicle posing a potential danger to a vulnerable road user (VRU); and
   receiving only transmissions of the safety-relevant vehicle and skipping reception of transmissions of non-safety-relevant vehicles by:
   identifying periodically a slot and a respective subchannel for V2X transmission of the safety-relevant vehicle, and receiving the current slot and respective subchannel if the current slot and respective subchannel are identified as allocated to the safety-relevant vehicle, or skipping the reception of the current slot and respective subchannel if the current slot and respective subchannel are not identified as allocated to the safety-relevant vehicle,
   terminating the reception of the current slot and respective subchannel if the current slot and respective subchannel are identified as allocated to the safety-relevant vehicle but do not include transmissions of the safety-relevant vehicle, and
   if the current slot and respective subchannel do not include transmissions of the safety-relevant vehicle, scanning for transmissions of the safety-relevant vehicle in slots and respective subchannels proximal to the current slot and subchannel and, upon finding such proximal slots and respective subchannels, updating a database with the found slots and respective subchannels,
   thereby lowering V2X reception power consumption of a device carried by the VRU.

2. The method of claim 1, wherein the determining that a vehicle is a safety-relevant vehicle includes receiving V2X messages from a plurality of vehicles during a predetermined period and grading the safety-relevance of each vehicle using a respective respective location, speed, and heading of each vehicle.

3. The method of claim 1, wherein the terminating of the reception current slot and respective subchannel includes activating a V2X receiver, measuring subchannel energy received during an AGC symbol, comparing the measured energy of each subchannel with a threshold, and if, the measured energy is lower than the threshold, terminating the reception.

4. A device, comprising: a vehicle-to-everything (V2X) receiver configured to determine, using V2X communications, that a vehicle is a safety-relevant vehicle posing a potential danger to a vulnerable road user (VRU), and to receive only transmissions of the safety-relevant vehicle and skip reception of transmissions of non-safety-relevant vehicles, thereby lowering V2X reception power consumption of a device carried by the VRU, wherein the V2X receiver includes an adaptive gain control (AGC) unit configured to measure subchannel energy and wherein the device further comprises a slot filter that provides an input used by the AGC unit to decide whether to receive or stop reception of the packet.

5. The device of claim 4, wherein the V2X receiver includes a data channel receiver and a control channel receiver, and wherein the device further comprises a L1 ID filter configured to hold an expected L1 ID value and to match the expected L1 ID value with a L1 ID value received in a physical sidelink control channel (PSCCH) by the control data receiver.

6. The device of claim 5, wherein if the AGC unit did not stop reception and if the expected L1ID value matched the received L1 ID value, the L1 ID filter is further configured to store a physical sidelink data channel (PSSCH) only for the given subchannel.

7. The device of claim 4, further comprising a safety-relevant vehicles controller configured to determine that a vehicle is to be monitored with a given periodicity, and to provide to the V2X receiver an input to determine that the vehicle is a safety-relevant vehicle.

8. The device of claim 4, further comprising a safety-relevant vehicles controller configured to determine that a vehicle is to be monitored with a given periodicity, and to provide to the V2X receiver an input to determine that the vehicle is a safety-relevant vehicle.

9. The device of claim 5, further comprising a safety-relevant vehicles controller configured to determine that a vehicle is to be monitored with a given periodicity, and to provide to the V2X receiver an input to determine that the vehicle is a safety-relevant vehicle.

10. The device of claim 6, further comprising a safety-relevant vehicles controller configured to determine that a vehicle is to be monitored with a given periodicity, and to provide to the V2X receiver an input to determine that the vehicle is a safety-relevant vehicle.

* * * * *